United States Patent [19]
Nelson

[11] 3,715,924
[45] Feb. 13, 1973

[54] FLUID EXPANDABLE TEMPERATURE APPARATUS HAVING EXCESSIVE TEMPERATURE RELIEF APPARATUS

[75] Inventor: Lorne W. Nelson, Bloomington, Minn.

[73] Assignee: Honeywell Inc., Minneapolis, Minn.

[22] Filed: Sept. 4, 1970

[21] Appl. No.: 69,864

[52] U.S. Cl. ................73/368, 29/195.5, 73/362.4, 337/319
[51] Int. Cl. ..........................G01k 5/02, H01h 37/36
[58] Field of Search..........73/368, 362.4, 363, 362.7; 238/99; 29/195.5; 324/105; 337/319

[56] References Cited

UNITED STATES PATENTS

| | | | |
|---|---|---|---|
| 2,821,605 | 1/1958 | Bakor | 373/314 |
| 2,798,764 | 7/1957 | Ray | 73/363 |
| 3,127,760 | 4/1964 | Kirkpatrick et al. | 73/363 |
| 3,194,074 | 7/1965 | Anderson et al. | 29/195.5 X |
| 3,434,350 | 3/1969 | Kinney | 73/362.4 |

FOREIGN PATENTS OR APPLICATIONS

| | | |
|---|---|---|
| 230,380 | 8/1958 | Australia |
| 526,378 | 10/1920 | France |

*Primary Examiner*—S. Clement Swisher
*Assistant Examiner*—Daniel M. Yasich
*Attorney*—Lamont B. Koontz and Clyde C. Blinn

[57] ABSTRACT

A temperature responsive control apparatus having a fluid filled system wherein upon a change in temperature of a fluid filled responsive element an increase in volume of the fluid produces an output. A metal plug which is contained in the fluid of the responsive element has a substantially constant volume throughout the normal temperature working range, but decreases in volume above a predetermined maximum temperature to limit the volume change to protect the control apparatus when being exposed to excessive destructive temperatures above the predetermined temperature.

6 Claims, 3 Drawing Figures

PATENTED FEB 13 1973　　　　　　　　　　　　　　　　3,715,924

INVENTOR.
LORNE W. NELSON
BY *Clyde C. Blinn*
ATTORNEY.

3,715,924

FLUID EXPANDABLE TEMPERATURE APPARATUS HAVING EXCESSIVE TEMPERATURE RELIEF APPARATUS

BACKGROUND AND SUMMARY OF THE INVENTION

In temperature control apparatuses having expandable fluid or liquid filled systems, the working output throughout a normal temperature range has been limited unless a means is provided to protect the apparatus when the temperature exceeds the normal range. With such an expandable fluid device, the displacement or volume change obtained through a normal temperature for apparatus not having some sort of protective device is a compromise to assure that upon the temperature exceeding the normal temperature range, the maximum tolerable displacement will not be reached. Unless some protective device is added which results in a more expensive control apparatus, the achievable displacement for a normal working range can be quite limited.

In the present invention the temperature responsive expandable system contains a metal plug or member which is substantially unaffected by the change in temperature throughout the normal temperature range but upon the temperature of the sensing portion of the system containing the member exceeding some predetermined temperature beyond the normal working range, the output is limited. Specifically, the dimension or volume of the member decreases to limit the resultant maximum expansion of the system beyond the normal temperature range. With such a member in an expandable fluid system, a much higher rate of change in volume throughout the normal working range can be selected and yet the effect of excessive temperature on the control apparatus is reduced without the need of strain relief or other such complicated and cost increasing apparatus.

FIG. 1 of the drawing is a schematic showing of the temperature control apparatus having a remote bulb connected to a bellows making an expandable fluid filled system with a metal plug in the fluid of the remote sensing element.

DESCRIPTION AND OPERATION OF THE INVENTION

Figure 1:
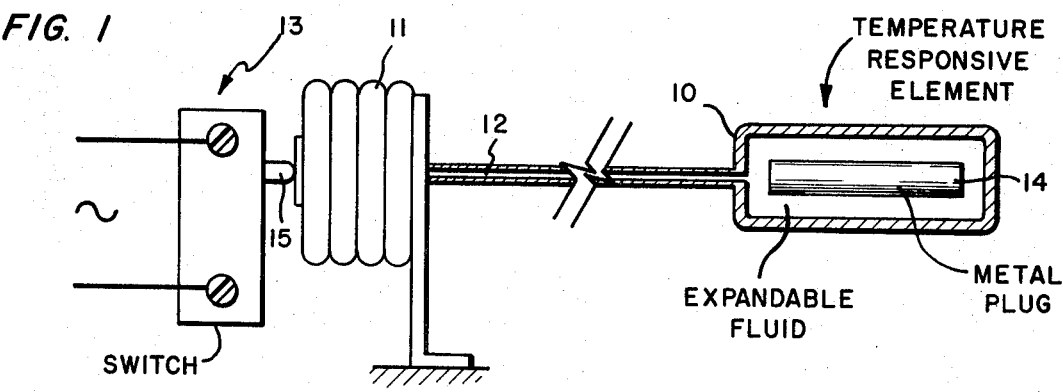
Figure 3:
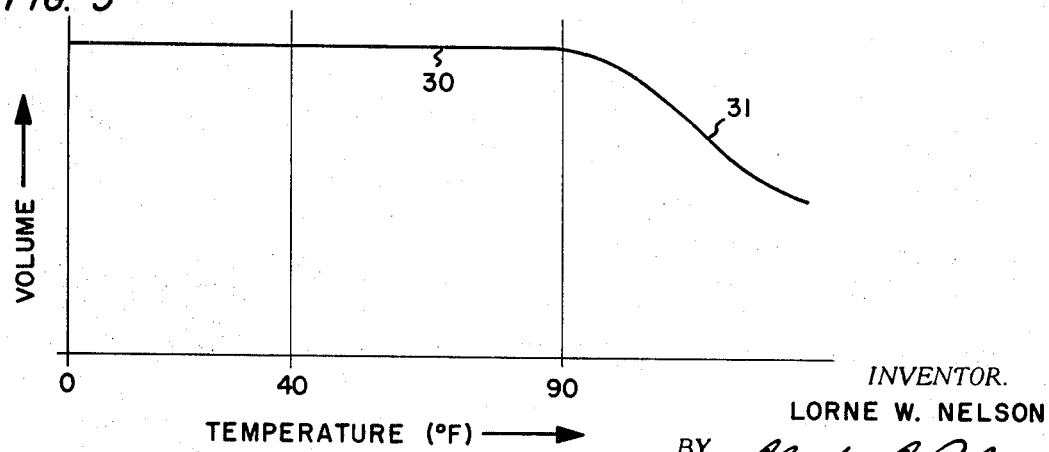
FIG. 3 is a graphical representation of the volume versus temperature characteristic of a typical metal plug used in the sensing element of the apparatus shown in FIG. 1.

Referring to FIG. 1, a temperature control apparatus or system of an expandable fluid or liquid filled type has a remote bulb or temperature responsive means 10 which is connected to a means or bellows 11 providing an output responsive to the change in volume of the fluid in bulb 10 by a capillary tube 12 to form a fluid filled system. Upon a change in the volume of the fluid in bellows 11 the output is provided to operate a switch 13. Contained in the responsive element 10 is a temperature responsive, expandable member or metal plug 14 which has a volume change for changes in temperature as shown in FIG. 3.

Figure 2:
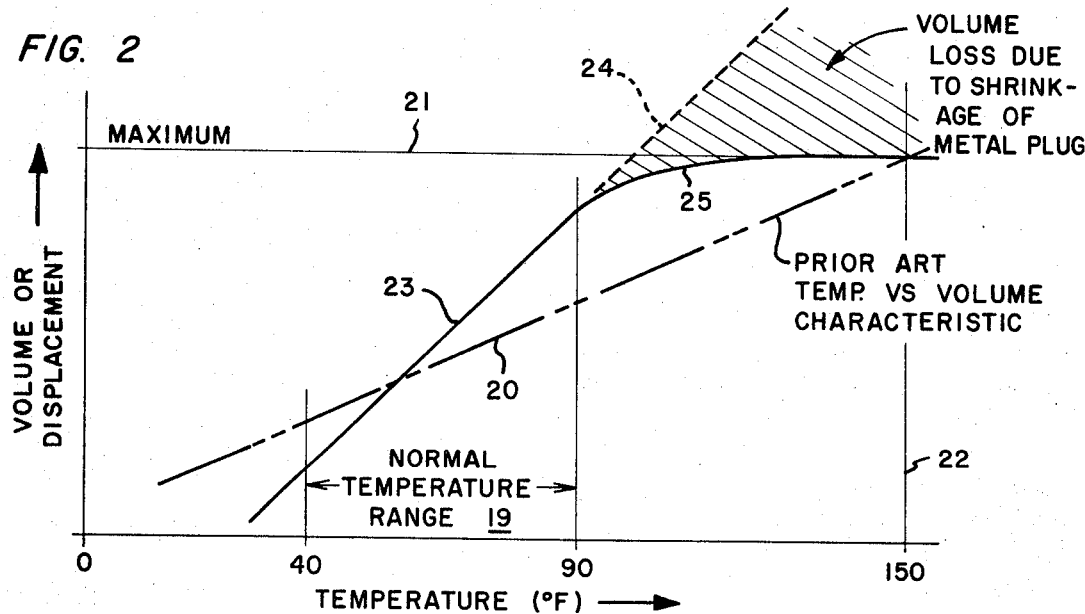
FIG. 2 is a graphical representation of the typical displacement versus temperature obtained from the control apparatus of FIG. 1 with changes in displacement versus temperature of the remote bulb for both the prior art systems and systems with the metal plug.

In an expandable fluid system as shown in FIG. 1, the change in volume of the fluid throughout a normal temperature range 19 or "working range" such as 40° to 90°F. as shown in FIG. 2 produces an output or displacement which is used to operate switch 13. When the temperature exceeds the normal working range, the increase in volume of the fluid has some maximum limit or maximum displacement depending upon the design of the particular apparatus. In the apparatus of FIG. 1, excessive movement of the switching operating pin 15 may result in damage to the switch 13.

Unless some protective means or apparatus is used to limit the affect of this maximum change in volume, the slope of the volume versus temperature characteristic of a fluid filled apparatus as shown in FIG. 2 must be relatively low or flat as shown by the dashed line 20. With such a prior art apparatus, when the temperature exceeds the normal temperature range 19, the maximum desired volume 21 is not exceeded without the temperature exceeding some high temperature 22. The maximum temperature at 22 is generally used in the design of the device and may be the maximum temperature the apparatus may be exposed to during shipment or storage. The change in volume or displacement through the normal working range of 40° to 90°F. is relatively small to limit the total bellows 15 movement or output having an effect on the differential with the small $\Delta$ volume/$\Delta$ temperature.

With the present invention, a different fluid (such as Toluene having an average coefficient of cubical expansion of $6.26 \times 10^4$) is used having a larger volume versus temperature characteristic as shown by the line 23 in FIG. 2 to produce a much greater change in volume throughout the normal working range 19 of 40° to 90°F. to have a larger $\Delta$volume/$\Delta$ temperature. As shown, such a fluid produces a volume or displacement exceeding the maximum displacement 21 at a temperature slightly above the normal working range as shown by the extension 24 of the line 23.

With metal plug 14 in the fluid of the temperature responsive element 10, the resultant change 25 in dimension, displacement or volume versus temperature characteristic for the fluid having the characteristic shown by the extension of line 23 does not exceed the maximum desired displacement 21. Metal plug 14 has a dimension, displacement or volume versus temperature characteristic as shown in FIG. 3 which is substantially constant as shown by the flat line 30 throughout the normal temperature range 19 of 40° to 90°F. When the temperature exceeds 90°F., the volume of plug 14 decreases in volume in an opposite sense of the fluid as shown by the curved line 31 being an extension of line 30. The decrease in volume of metal plug 14 above the 90°F. temperature compensates for the increase in volume of the fluid. The volume or displacement versus temperature characteristic of the fluid filled system, line 23 in FIG. 2 extended above 90°F. is shown at 25 to remain below the maximum displacement limit 21 whereby the control apparatus can be subjected to the higher temperatures without the maximum displacement limit being exceeded.

Another embodiment of the present invention is a linear expansion system such as a rod and tube temperature responsive apparatus wherein a portion of the tube is made of the metal of plug 14. The contraction of the metal portion above a predetermined temperature will limit the output of such a rod and tube apparatus.

While the invention is not limited to any particular member or plug 14, one type of member is described in an article "First-Order Magnetic Transitions in (Fe,Mn)$_{\geq 2}$As" in Vol. 40, No. 3, P. 1,361–1,363, Mar. 1, 1969 of *Journal of Applied Physics* and is manufactured by E. I. DuPont deNemours and Company. The material is known for its magnetic compounds with temperature induced transitions in which a series of manganese/iron/arsenic alloys or compositions exhibit a magnetic phase change at a transition temperature to have opposite coefficient of linear expansion above the transition temperature. A volume change of such a member 14 in the transition temperature range can be selected by the composition of the alloy.

The embodiments of the invention in which an exclusive property or right is claimed are defined as follows:

1. In a temperature control apparatus having a temperature responsive means connected to an output means wherein a change in temperature of said temperature responsive means in a first sense produces a changing output, the improvement comprising:
   a temperature responsive member operably connected to said output means and subjected to the temperature change of said temperature responsive means for effecting in an opposite sense said output to limit said output when the temperature exceeds a predetermined value in said first direction.

2. The invention of claim 1 wherein,
   said temperature responsive means contains a non-compressible fluid which expands in volume on a change in temperature,
   said output is provided by means responsive to a change in volume of said fluid is connected to said responsive means, and
   said temperature responsive member is connected to said responsive means and subjected to the change in temperature to limit said change in volume beyond a predetermined temperature.

3. The invention of claim 2 wherein,
   said temperature responsive member is a metal plug contained in the liquid of said responsive means,
   said plug having a substantially constant volume through a first range of temperature and contracts on an increase in temperature beyond said predetermined temperature.

4. The invention of claim 2 wherein,
   said temperature responsive member is a metal plug forming a part of said volume of fluid,
   said member changes in volume in an opposite sense to said fluid above a predetermined temperature to limit said change in volume said means responsive is subjected.

5. The invention of claim 1 wherein,
   said temperature responsive member has a substantially constant dimension through a normal working range of temperatures and contracts on an increase in temperature above said working range.

6. A temperature control apparatus comprising;
   first and second temperature responsive means operably connected to an output means to provide an output upon a change in temperature of said first and second means throughout a first range of temperatures,
   said second temperature responsive means having a transition temperature above said first range of temperature at which said second means responds to an increase in temperature beyond said first range in an opposite manner to cancel the effect of said first temperature responsive means to limit said output below a predetermined limit, and
   means operably connected to said output means to be responsive to said output throughout said first range of temperature and protected from an excessive output above said predetermined limit when said temperature exceeds a temperature above said first range.

* * * * *